O. F. STEDMAN.
Coffee Pot.
No. 94,787. Patented Sept. 14, 1869.
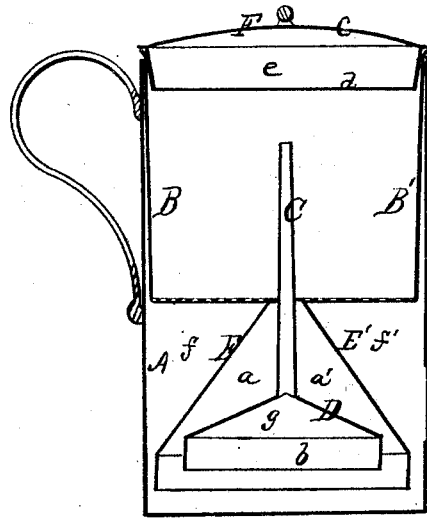
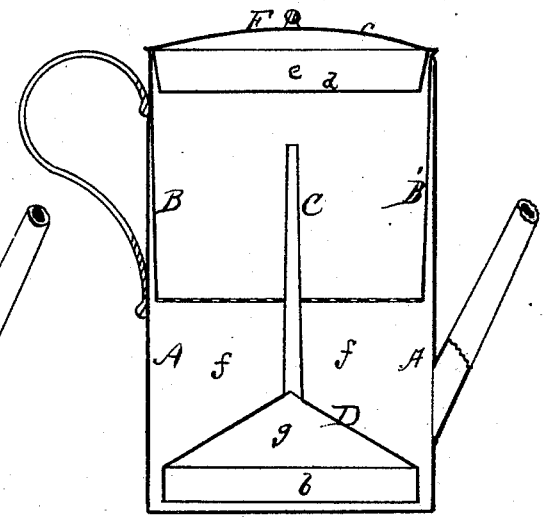

United States Patent Office.

OSCAR F. STEDMAN, OF WESTFIELD, NEW YORK.

Letters Patent No. 94,787, dated September 14, 1869.

COFFEE-POT.

The Schedule referred to in these Letters Patent and making part of the same.

*To all whom it may concern:*

Be it known that I, OSCAR F. STEDMAN, of Westfield, in the county of Chautauqua, and State of New York, have invented certain new and useful Improvements in Coffee-Pots; and I do hereby declare that the following is a full and exact description thereof, reference being had to the accompanying drawings, in which—

Figure 1 is a vertical section, and
Figure 2, a similar view, but without the outer conical case or cylinder, situated under the pot.

Like letters of reference indicate corresponding parts in both figures.

My improvement is of that class in which the boiling liquid is forced up, by the action of the steam, through a tube, and brought in contact with the coffee, situated in an elevated perforated cup.

The invention consists essentially in combining, with the ordinary steam-chamber and tube, an outer jacket, which forms an additional steam-chamber, whereby a more effective pressure of the steam is produced; also, in the special arrangement of parts, as hereinafter set forth.

In constructing my coffee-pot, the outer case A is of the usual form, and I also employ the common interior perforated cup B, in which the coffee is deposited.

Through the centre of this perforated cup, protrudes a small conical steam-pipe, C, to the bottom of which is attached an inverted flaring cup or chamber, D, entirely open at the bottom, being formed with or without a rim, b, and standing just above the bottom of the coffee-pot proper. This receives the steam generated from the boiling water, the steam rising, through pipe C, into cup B, and carrying with it a body of water, thus permeating the coffee.

To further aid in accomplishing this desirable effect, I form, outside the chamber D, a second chamber or jacket, E, the top of which is firmly attached to the perforated cup's bottom and around pipe C, but with no escape into the cup, the bottom standing just above that of the pot itself, as clearly shown in the drawings.

By this construction I secure several important advantages, as I am enabled to make the diameter of the tube C small, and run it nearly to the bottom of the pot, only expanding the part D, to form a mouthpiece to receive the steam and direct the water upward.

The outside jacket E forms the main steam-chamber, and, by reason of its large size and capacity, it can be made to produce great pressure upon the water, and thereby insure a quick and active circulation of the liquid.

In other pots, where the outside jacket E is dispensed with, either the chamber D has to be situated very low down in the pot to accommodate low water, in which case little or no steam-space can be formed in the chamber, owing to its contracted size, or else the base of said steam-pipe must be situated high up above the bottom of the pot to produce the steam-space, in which case, when the water is low, it will not rise in the pot at all.

I obviate all difficulties of this kind by bringing the tube low, and forming the mouth-piece D, and employing, in connection with the same, an outside chamber, E.

This arrangement I believe to be entirely novel.

It will be noticed that the part D acts not only as a mouth-piece, to direct the fluid, but serves also as a steam-chamber in itself, by which the action is made more direct when there is but a small amount of pressure.

The cup B is removable from the pot, in order that all parts may be easily cleaned; and it may also be made detachable or separate from chamber E and tube C, if desired. In this case, the latter will be attached to the bottom or sides of the pot, and a coupling is made on the tubes, one part sliding over the other, or in any other desirable manner.

To prevent an escape of steam, and consequently of the aroma and strength of the coffee, I form a condenser of the cover F of the pot A, by making it double, with top $c$, bottom $d$, and space $e$, into which is put cold water, through a suitable opening in the top, or sand, plaster of Paris, or other suitable non-conducting material, so that the steam striking against it is condensed, and falls down in a liquid form through the coffee, and back into the water-space $f$.

I do not claim, broadly, a tube with an enlarged base, which forms a steam-chamber of itself, as I am aware that the same has been used before; but

What I claim as my invention, and desire to secure by Letters Patent, is—

The combination, with the tube C and enlarged chamber or mouth-piece D, of the exterior jacket or chamber E, the said chambers being both steam-chambers, and one enclosing the other, the whole arranged as described, and operating, in connection with the cup B, in the manner and for the purpose specified.

In witness whereof, I have hereunto signed my name, in the presence of two subscribing witnesses.

O. F. STEDMAN.

Witnesses:
J. R. DRAKE,
LYMAN P. PERKINS.